(No Model.)

J. SCHIPKOWSKY.
PNEUMATIC TIRE.

No. 543,319. Patented July 23, 1895.

Inventor
Julius Schipkowsky.

Witnesses
Wm. F. Doyle.

By his Attorneys.
C. A. Snow & Co.

United States Patent Office.

JULIUS SCHIPKOWSKY, OF MILWAUKEE, WISCONSIN, ASSIGNOR OF ONE-HALF TO WALTER P. HATCH, OF SAME PLACE.

PNEUMATIC TIRE.

SPECIFICATION forming part of Letters Patent No. 543,319, dated July 23, 1895.

Application filed July 14, 1894. Serial No. 517,620. (No model.)

*To all whom it may concern:*

Be it known that I, JULIUS SCHIPKOWSKY, a citizen of the United States, residing at South Milwaukee, in the county of Milwaukee and State of Wisconsin, have invented a new and useful Pneumatic Tire, of which the following is a specification.

This invention relates to an improvement in that class of pneumatic tires wherein two tubes are provided and arranged one within the other; and the invention consists in certain hereinafter-described improvements in the means for joining the outer or protector tube to the rim or tire of the wheel.

Figure 1:
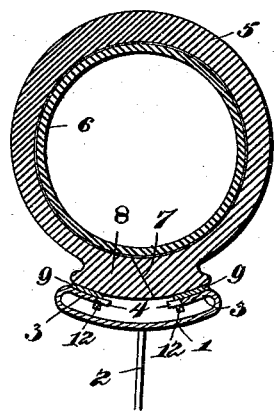
Figure 2:
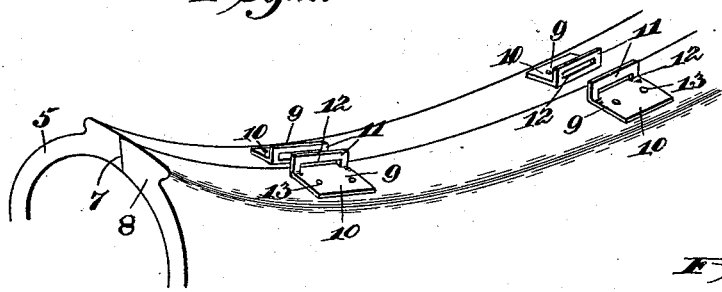
Figure 3:
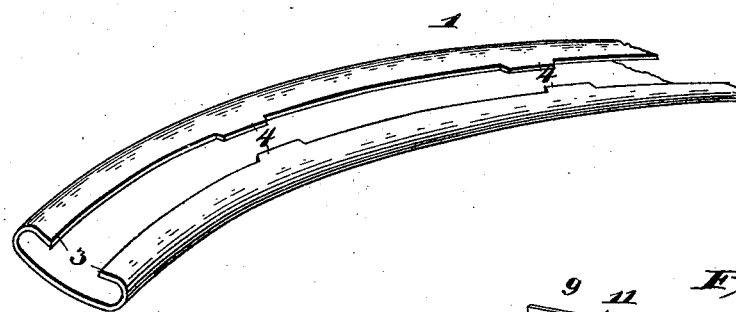
Figure 4:
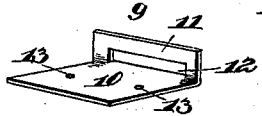

In the accompanying drawings, Figure 1 represents a cross-section taken through a tire having my improvements applied; Fig. 2, a perspective view of a portion of the outer or protector tube and showing attached thereto the devices for assisting in securing it to the tire of the wheel; Fig. 3, a similar view of the tire or rim of the wheel and illustrating the devices which it carries for effecting the connection aforesaid; Fig. 4, an enlarged detail perspective of one of the eyelets which are secured to the outer tube.

The reference-numeral 1 indicates the rim or metallic portion of the wheel-tire, which is connected to the spokes 2, as usual, and which has its sides bent inwardly or toward each other to form the lips 3. Formed integral with the lips 3 and projecting inwardly therefrom are the teeth 4, which are arranged on the lips 3 at predetermined and equidistant points, and which are formed by preference tapering.

5 indicates the outer or protector tube, which may be of the usual or any approved construction, and which has arranged therein the inner or air-receiving tube 6. The tube 5 is formed with a longitudinal slit 7, extending diagonally through its sides and longitudinally throughout its length. The purpose of this slit is to permit the insertion of the tube 6.

The outer tube 5 is joined to the rim 1 at that part in which the slot 7 is formed, and this portion is formed with a thickened part 8 directly adjacent to the slit 7. 9 indicates the eyelets aforesaid, and these consist of integral steel plates formed with an approximately-horizontal base portion 10 and perpendicular part 11. The base portion 10 is provided with the openings 13, through which rivets pass to secure it to the thickened portions 8 of the tube 5, while the perpendicular portion 11 is formed with the transverse slot 12.

The base portions 10 of the eyelets 9 are firmly secured to the thickened portions 8 by means of rivets passed through the openings 13, while the studs 11 project upwardly from the tube 5 and into the space between the lips 3 of the rim 1, so that the slots 12 will be capable of receiving the teeth 4 of the rim 1. The eyelets 9 are arranged on the tire-tube 5 at intervals equal to the intervals of the teeth 4, so that when the parts are assembled the teeth and eyelets will coincide and make it possible to connect the parts.

In the use of my invention the air-receiving tube 6 is placed within the tube 5 and the edges of the latter tube, formed by the slit 7, are drawn together, so that the eyelets 9 will be capable of receiving their respective teeth 4 within the slot 12 of their perpendicular studs 11. By this arrangement the tube 5 is connected to the rim 1 in a secure and effective way and the displacement or disconnection of the parts from the operation of the tire rendered impossible.

Having described the invention, I claim—

In a pneumatic tire, the outer case or cover thereof having a diagonal split extending longitudinally around its inner face and forming overlapping edges and thickened adjacent to said split in order to afford sufficient body and stiffness to render the tire self-supporting, and a series of fastening plates arranged in pairs throughout the length of said case or cover, the members of each pair being oppositely disposed to each other and riveted to the thickened inner face of the tire upon each side of the split therein and slightly removed therefrom, each of said fastening plates being made from sheet metal having a perforated base portion adapting it to be riveted to said outer case or cover and also having a perpendicular portion disposed at a right angle to the base and extending inwardly toward the rim, said perpendicular portion being slotted to engage teeth on the rim, in combination with a bicycle wheel rim formed from a strip of sheet metal having its opposite edges overturned and disposed outwardly and extending in parallel relation to the main portion or body of the rim, said bent over portions or edges being substantially of U-shape in cross section and projecting inwardly toward each other sufficiently to form a seat for the tire, and a series of projections or teeth formed integrally with the inwardly projecting edges of the rim and disposed oppositely to each other, said projections or teeth being formed at regular intervals throughout the length of the rim and adapted to engage the fastening plates carried by the outer case or cover of the tire, substantially as and for the purpose specified.

In testimony that I claim the foregoing as my own I have hereto affixed my signature in the presence of two witnesses.

JULIUS SCHIPKOWSKY.

Witnesses:
EDWARD OERTEL,
THOMAS J. EVANS.